United States Patent

Nguyen et al.

[11] Patent Number: 5,961,628
[45] Date of Patent: Oct. 5, 1999

[54] LOAD AND STORE UNIT FOR A VECTOR PROCESSOR

[75] Inventors: Le Trong Nguyen, Monte Sereno; Heonchul Park; Seong Rai Cho, both of Cupertino, all of Calif.

[73] Assignee: Samsung Electronics Co., Ltd., Seoul, Rep. of Korea

[21] Appl. No.: 08/789,575

[22] Filed: Jan. 28, 1997

[51] Int. Cl.[6] .................................................. G06F 15/80
[52] U.S. Cl. ..................................... 712/2; 712/6
[58] Field of Search ............................ 395/800.02, 858, 395/859, 885, 886, 888, 890, 800.06; 712/2

[56] References Cited

U.S. PATENT DOCUMENTS

| | | | |
|---|---|---|---|
| 4,507,731 | 3/1985 | Morrison | 711/201 |
| 4,910,667 | 3/1990 | Tanaka | 711/168 |
| 5,019,969 | 5/1991 | Itumisawa | 395/800.04 |
| 5,201,058 | 4/1993 | Kinoshita | 395/800.06 |

*Primary Examiner*—Eric Coleman
*Attorney, Agent, or Firm*—Skjerven, Morrill, MacPherson, Franklin & Friel; David T. Millers LLP

[57] ABSTRACT

An apparatus coupled to a requesting unit and a memory. The apparatus includes a data path and a request control circuit. The data path is coupled to the requesting unit and the memory. The data path is for buffering a vector. The vector includes multiple data elements of a substantially similar data type. The request control circuit is coupled to the data path and the requesting unit. The request control circuit is for receiving a vector memory request from the requesting unit. The request control circuit services the vector memory request by causing the transference of the vector between the requesting unit and the memory via the data path.

23 Claims, 6 Drawing Sheets

LOAD AND STORE UNIT FOR A VECTOR PROCESSOR

BACKGROUND OF THE INVENTION

1. Field of the Invention

This invention relates to computer systems and, more particularly, to providing load and store units for vector processors within computer systems.

2. Description of the Related Art

A vector processor or single instruction multiple data (SIMD) processor performs parallel calculations on multiple data elements that are grouped together to from data structures called "vectors." Such vector processors are well suited to multimedia processing which often requires a large number of identical calculations. For example, for video coding, a pixel map representing a video image often contains thousands of pixel values, each of which must be processed in the same manner. A single vector can contain multiple pixel values that the vector processor processes in parallel in a single clock cycle. Accordingly, the parallel processing power of a vector processor can reduce processing time for such repetitive task by a factor equal to the number of data elements in a vector.

All data elements in a vector typically have the same data type, but vector processors may accommodate data elements of different sizes in different vectors. For example, all of the data element in one vector may be 16-bit integers while the data elements in another vector are 32-bit floating point values. Conventionally, data elements and processing circuits in vector processors accommodate possible data widths that are multiples of 8 because convention memories uses addresses corresponding to 8-bit of storage. However, some processing may be more efficiently done using a data width that is not a multiple of eight. Video processing according to the MPEG standards, for example, includes a 9-bit data type. A vector processor that accommodates 16-data elements can process 9-bit values as 16-bit values, but that wastes much of the data width and processing power of the vector processor.

A vector processor can be adapted to process odd size data elements such as a 9-bit data type, if the internal data path and execution units of the processor have the proper data widths. However, if conventional memory is to be used, functional units that access memory, such as a load/store unit in the processor may need to convert vectors having odd size data elements that do not have a simple match to 8-bit storage locations. A load/store unit that efficiently handles vectors with odd data element sizes is sought.

SUMMARY OF THE INVENTION

A load/store unit within a vector processor services memory requests to load or store vectors (multiple data elements of a substantially similar type). Such an apparatus provides the advantage of handling vectors instead of individual data elements. Further, such an apparatus provides the advantage of performing parallel calculations using multimedia data structures, thereby increasing the performance of processors required to perform such calculations.

In one embodiment of the invention, an apparatus is coupled to a requesting unit and a memory. The apparatus includes a data path and a request control circuit. The data path is coupled to the requesting unit and the memory. The data path is for buffering a vector. The vector includes multiple data elements of a substantially similar data type. The request control circuit is coupled to the data path and the requesting unit and receives a vector memory request from the requesting unit. The request control circuit services the vector memory request by causing the transference of the vector between the requesting unit and the memory via the data path.

In a further embodiment, the apparatus is a load/store unit for a vector processor. In yet a further embodiment, the apparatus is a vector load unit. In still yet a further embodiment, the apparatus is a vector store unit.

In another embodiment of the invention, a computer system includes a vector processor, a memory and a load store unit. The load/store unit is coupled to the vector processor and the memory and includes a read/write data path and a request control circuit. The read/write data path is for buffering vectors. Each of the vectors includes multiple data elements of a substantially similar data type. The request control circuit is coupled to the read/write data path and the vector processor. The request control circuit is for receiving vector memory requests from the vector processor. The request control circuit services the vector memory requests by causing the transference of the vectors corresponding to the vector memory requests between the vector processor and the memory via the read/write data path.

In another embodiment, a method for loading and storing unaligned vector data with variable data types includes: receiving a first vector request for a first vector, the first vector request requesting access to a memory, the first vector including multiple data elements of a substantially similar data type; determining whether the first vector request is vector unaligned; generating a plurality of aligned vector requests corresponding to the first vector request if the first vector request is vector unaligned; providing the aligned vector requests to the memory; and servicing the aligned vector requests by the memory.

In another embodiment, a method for loading and storing unaligned vector data with variable data types includes: receiving a first vector request for a first vector, the first vector request requesting access to a memory, the first vector including multiple data elements of a substantially similar data type; determining whether the first vector request is vector unaligned; generating a plurality of aligned vector requests corresponding to the first vector request if the first vector request is vector unaligned; providing the aligned vector requests to the memory; and servicing he aligned vector requests by the memory.

In another embodiment, a method for loading and storing 9-bit byte data in an 8-bit byte memory system includes: receiving a 9-bit byte memory request from a requesting device; generating a plurality of 8-bit byte memory requests from the 9-bit byte memory request; providing the plurality of 8-bit byte memory requests to a memory system; storing a plurality of 8-bit bytes corresponding to the 8-bit byte memory requests in the 8-bit byte memory system if the 9-bit byte memory request is a memory write; receiving a plurality of 8-bit byte results corresponding to the plurality of 8-bit byte memory requests if the 9-bit byte memory request is a memory read; assembling the plurality of 8-bit byte results into a 9-bit byte result if the 9-bit byte memory request is a memory read; and providing the 9-bit byte result to the requesting device if the 9-bit byte memory request is a memory read.

In another embodiment, a method for out-of-order loading and storing of vectors through the use of transaction ID tags includes: a first step of receiving a first vector request from a first requesting device by a load/store unit; a second step of providing a first memory request corresponding to the first vector request to a memory system by the load/store unit after the first step; a third step of providing a first transaction ID tag indicating the first memory request to the load/store unit by the memory system after the second step; a fourth step of storing the first transaction ID tag by the load/store unit after the third step; a fifth step of receiving a second vector request from a second requesting device by the load/store unit after the first step; a sixth step of providing a second memory request corresponding to the second vector request to the memory system by the load/store unit after the fifth step; a seventh step of providing a second transaction ID tag indicating the second memory request to the load/store unit by the memory system after the sixth step; a eighth step of storing the second transaction ID tag by the load/store unit after the seventh step; a ninth step of receiving by the load/store unit a first memory request result and the first transaction ID tag if the first memory request result is required by the first memory request, the ninth step being after the third step; a tenth step of receiving by the load/store unit a second memory request result and the second transaction ID tag if the second memory request result is required by the second memory request, the tenth step being after the eighth step; an eleventh step of providing the first request result and the first transaction ID tag to the first requesting device by the load/store unit if the first memory request result is required by the first vector request, the eleventh step being after the ninth step; and a twelfth step of providing the second request result and the second transaction ID tag to the second requesting device by the load/store unit if the second memory request result is required by the second vector request, the twelfth step being after the tenth step.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions and improvements may fall within the scope of the invention as defined in the claims that follow.

Figure 1:
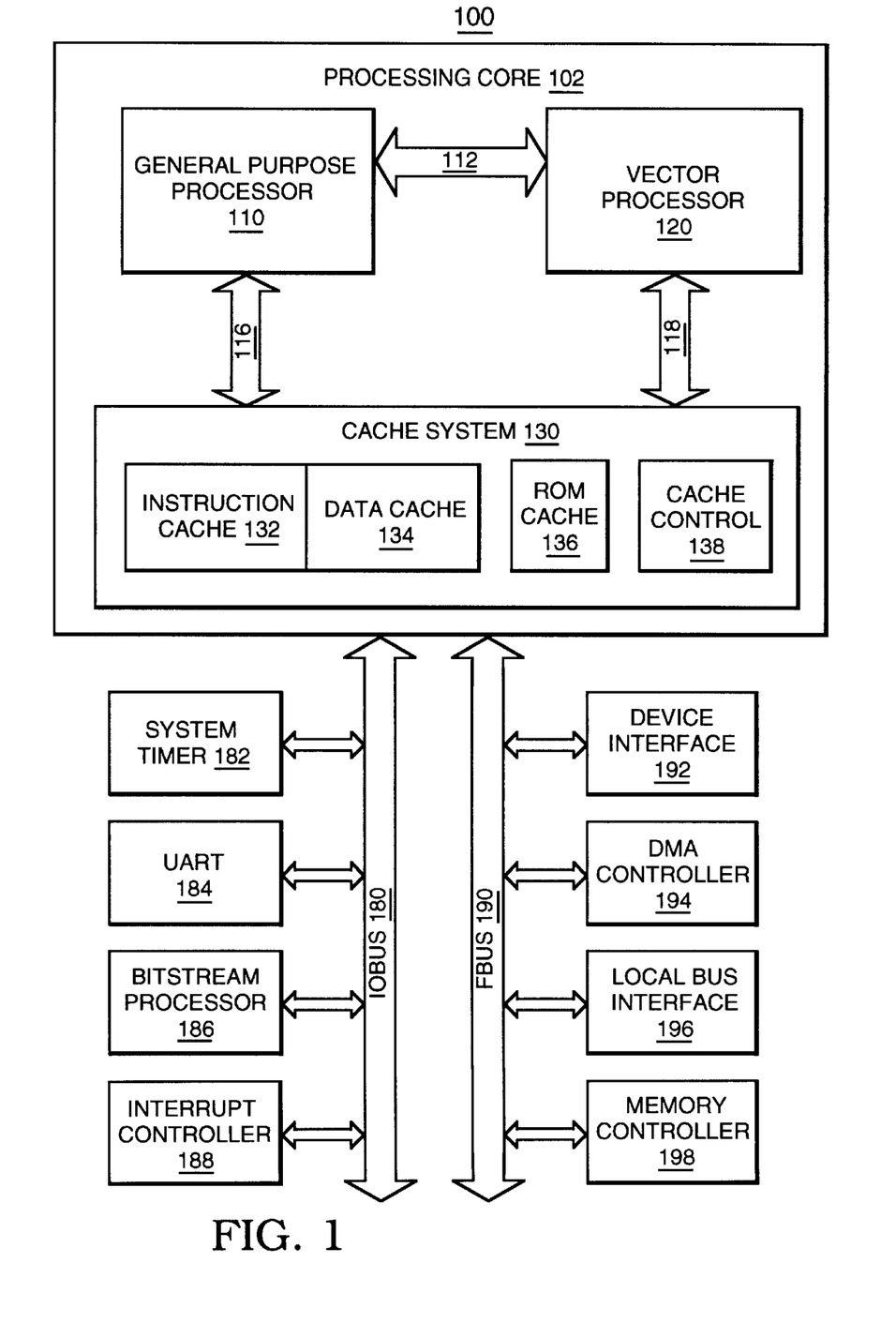
FIG. 1 is a block diagram of a multimedia signal processor in accordance with an embodiment of the invention.

FIG. 1 is a block diagram of a multimedia signal processor 100 such as described in U.S. patent application Ser. No. 08/699,597, attorney docket No. M-4355 US, filed on Aug. 19, 1996, entitled "Single-Instruction-Multiple-Data Processing in a Multimedia Signal Processor," and naming Le Trong Nguyen as inventor, and which is incorporated herein by reference in its entirety. Processor 100 includes a general purpose processor 110 coupled to a vector processor 120. General purpose processor 110 and vector processor 120 are coupled via bus 112. General purpose processor 110 and vector processor 120 are coupled to cache system 130 via bus 116 and bus 118, respectively. Cache system 130 contains a fast random access memory (RAM) block (shown graphically as blocks 132 and 134), read only memory (ROM) 136 and cache control logic 138. Cache system 130 can configure the RAM block into (i) an instruction cache 132A and a data cache 134A for general purpose processor 110, and (ii) an instruction cache 132B and data cache 134B for vector processor 120. Cache system is coupled to input/output bus (IOBUS) 180 and fast bus (FBUS) 190. IOBUS 180 is coupled to system timer 182, universal asynchronous receiver-transmitter (UART) 184, bitstream processor 186 and interrupt controller 188. FBUS 190 is coupled to device interface 192, direct memory access (DMA) controller 194, local bus interface 196 and memory controller 198.

General purpose processor 110 and vector processor 120 execute separate program threads in parallel. General purpose processor 110 typically executes instructions which manipulate scalar data. Vector processor 120 typically executes instructions having vector operands, i.e., operands each containing multiple data elements of the same type. In some embodiments, general purpose processor 110 has a limited vector processing capability and is generally suited for control operations. However, applications that require multiple computations on large arrays of data are not suited for scalar data or even limited vector processing.

For example, multimedia applications such as audio and video data compression and decompression often require many repetitive calculations on pixel arrays and strings of audio data. To perform real-time multimedia operations, a general purpose processor which manipulates scalar data (e.g. one pixel value or sound amplitude per operand) must operate at a high clock frequency. In contrast, a vector processor executes instructions where each operand is a vector containing multiple data elements (e.g. multiple pixel values or sound amplitudes). Therefore, vector processor 120 can perform real-time multimedia operations at a fraction of the clock frequency required for general purpose processor 110 to perform the same function.

By allowing an efficient division of the tasks required by applications that perform multiple computations on large arrays of data (e.g., multimedia applications) the combination of general purpose processor 110 and vector processor 120 provides a high performance per cost ratio. Although in the preferred embodiment, processor 100 is for multimedia applications, processor 100 may be used for other applications.

In one embodiment, general purpose processor 110 executes a real-time operating system designed for a media circuit board communicating with a host computer system. The real-time operating system communicates with a primary processor of the host computer system, services input/output (I/O) devices on or coupled to the media circuit board, and selects tasks which vector processor 120 executes. In that embodiment, vector processor 120 is designed to perform computationally intensive tasks requiring the manipulation of large data blocks, while general purpose processor 110 acts as the master processor to vector processor 120. Although general purpose processor 1 10 and vector processor 120 are on a media circuit board in the preferred embodiment, such is not required by the invention.

In the exemplary embodiment, general purpose processor 110 is a 32-bit RISC processor which operates at 40 MHz and conforms to the standard ARM7 instruction set. The architecture for an ARM7 reduced instruction set computer (RISC) processor and the ARM7 instruction set is described in the ARM7DM Data Sheet available from Advanced RISC Machines, Ltd., and which is incorporated herein by reference in its entirety. General purpose processor 110 also implements an extension of the ARM7 instructions set which includes instructions for an interface with vector processor 120. The extension to the ARM7 instruction set for the exemplary embodiment of the invention is described in copending, U.S. patent application Ser. No. 08/699,295, attorney docket No. M-4366 US, filed on Aug. 19, 1996, entitled "System and Method for Handling Software Interrupts with Argument Passing," and naming Seungyoon Peter Song, Moataz A. Mohamed, Heon-Chul Park and Le Nguyen as inventors, and which is incorporated herein by reference in its entirety. General purpose processor 110 is coupled to vector processor 120 by bus 112 to carry out the extension of the ARM7 instruction set. Bus 112 includes an interrupt line for vector processor 120 to request an interrupt on general purpose processor 110.

In the exemplary embodiment, vector processor 120 is the digital signal processing engine of a multimedia signal processor. Vector processor 120 has a single-instruction-multiple-data (SIMD) architecture and manipulates both scalar and vector quantities. Vector processor 120 consists of a pipelined reduced instruction set computer (RISC) processing core 102 that operates at 80 MHz and has a 288-bit vector register file. Each vector register in the vector register file can contain up to 32 data elements. A vector register can hold thirty-two 8-bit or 9-bit ("byte9"format) integer data elements (i.e., 8-bit bytes or 9-bit bytes), sixteen 16-bit integer data elements, or eight 32-bit integer or floating point elements. Additionally, the exemplary embodiment can also operate on a 576-bit vector operand spanning two vector registers.

The instruction set for vector processor 120 includes instructions for manipulating vectors and for manipulating scalars. The instruction set of exemplary vector processor 120 and an architecture for implementing the instruction set is described in the copending U.S. patent application Ser. No. 08/699,597, attorney docket No. M-4355 US, filed on Aug. 19, 1996, entitled "Single-Instruction-Multiple-Data Processing in a Multimedia Signal Processor," and naming Le Trong Nguyen as inventor (incorporated by reference above).

General purpose processor 110 performs general tasks and executes a real-time operating system which controls communications with device drivers. Vector processor 120 performs vector tasks. General purpose processor 110 and vector processor 120 may be scalar or superscalar processors. The multiprocessor operation of the exemplary embodiment of the invention is more fully described in pending U.S. patent application Ser. No. 08/697,102, attorney docket No. M-4354 US, filed on Aug. 19, 1996, entitled "Multiprocessor Operation in a Multimedia Signal Processor," naming Le Trong Nguyen as inventor, which is incorporated herein by reference in its entirety.

Referring again to FIG. 1, in an embodiment of a computer system according to the invention, general purpose processor 110 and vector processor 120 share a variety of on-chip and off-chip resources which are accessible through a single address space via cache system 130. Cache system 130 couples to any of several memory mapped devices such as bitstream processor 186, UART 184, DMA controller 194, local bus interface 196, and a coder-decoder (CODEC) device through device interface 192.

In the preferred embodiment, cache system 130 uses a transaction-oriented protocol to implement a switchboard for data access among the load/store units of the processors and the memory mapped resources. For example, the transaction-oriented protocol provides that if completion of an initial cache transaction is delayed (e.g., due to a cache miss), other cache access transactions may proceed prior to completion of the initial transaction. Cache system 130 and a load/store unit interact to implement a "step-aside-and-wait" capability for memory accesses. This capability is provided through the use of transaction IDs. When a load/store unit requests access to cache system 130, the cache controller of cache system 130 assigns a transaction ID to the request. When the cache system returns with the results of the request (e.g., if the request was a cache read), the cache system provides the requesting load/store unit with the corresponding transaction ID to identify to which of the requests the results are responsive. The transaction-oriented interaction of cache system 130 and the load/store units of the processors, and cache system 130 in general, are described in copending U.S. patent application Ser. No. 08/751,149, filed on Nov. 15, 1996, issued on Jan. 12, 1999 as U.S. Pat. No. 5,860,158 entitled "Cache Control Unit with a Cache Request Transaction-Oriented Protocol" naming Yet-Ping Pai and Le Trong Nguyen as inventors, which is incorporated herein by reference in its entirety. A similar transaction-oriented protocol for a shared bus system is described in pending, U.S. patent application Ser. No. 08/731,393, attorney docket No. M-4398 US, filed on Oct. 18, 1996, entitled "Shared Bus System with Transaction and Destination ID," naming Amjad Z. Qureshi and Le Trong Nguyen as inventors, which is incorporated herein by reference in its entirety.

Referring again to FIG. 1, cache system 130 couples general purpose processor 110 and vector processor 120 to two system busses: IOBUS 180 and FBUS 190. IOBUS 180 typically operates at a slower frequency than FBUS 190. Slower speed devices are coupled to IOBUS 180, while higher speed devices are coupled to FBUS 190. By separating the slower speed devices from the higher speed devices, the slower speed devices are prevented from unduly impacting the performance of the higher speed devices.

Cache system 130 also serves as a switchboard for communication between IOBUS 180, FBUS 190, general purpose processor 110, and vector processor 120. In most embodiments of cache system 130, multiple simultaneous accesses between the busses and processors are possible. For example, vector processor 120 is able to communicate with FBUS 190 at the same time that general purpose processor 110 is communicating with IOBUS 180. The combination of the switchboard and caching function is accomplished by using direct mapping techniques for FBUS 190 and IOBUS 180. Specifically, the devices on FBUS 190 and IOBUS 180 can be accessed by general purpose processor 110 and vector processor 120 by standard memory reads and write at appropriate addresses.

FBUS 190 provides an interface to the main memory. The interface unit to the memory is composed of a four-entry address queue and a one-entry write-back latch. The interface can support one pending refill (read) request from general purpose processor instruction cache 132A, one pending refill (read) request from vector processor instruction cache 132B, one write request from vector processor data cache 134B, and one write-back request from vector processor data cache 134B due to a dirty cache line.

In the preferred embodiment, FBUS 190 is coupled to various high speed devices. For example, memory controller 198 provides an interface for a local memory if a local memory is provided for processor 100. DMA controller 194 controls direct memory accesses between the main memory of a host computer and the local memory of processor 100. Local bus interface 196 provides an interface to a local bus coupled to a host processor. DMA controller 194 and local bus interface 196 are well known in the art. Device interface 192 provides a hardware interface to various devices such as digital-to-analog and analog-to-digital converters (DACs and ACDs, respectively) for audio, video and communications applications.

In the preferred embodiment, IOBUS 180 operates at a frequency (40 MHz) lower than the operating frequency (80 MHz) of FBUS 190, and is coupled to various devices. For example, system timer 182 (e.g., a standard Intel 8254 compatible interval timer) interrupts general purpose processor 110 at scheduled intervals. UART 184 is a serial interface (e.g., a 16450 UART compatible integrated circuit) for use in modem or facsimile applications which require a standard serial communication ("COM") port. Bitstream processor 186 is a fixed hardware processor which performs specific functions (e.g., initial or final stages of MPEG coding or decoding) on an input or output bitstream. An exemplary embodiment of bitstream processor 186 is described in pending U.S. patent application Ser. No. 08/699,303 now U.S. Pat. No. 5,746,952, attorney docket No. M-4368 US, filed on Aug. 19, 1996, entitled "Methods and Apparatus for Processing Video Data," naming Cliff Reader, Jae Cheol Son, Amjad Qureshi and Le Nguyen as inventors, which is incorporated herein by reference in its entirety. Interrupt controller 188 controls interrupts of general purpose processor 110 and supports multiple interrupt priorities (e.g., according to the standard Intel 8259 interrupt system).

The above referenced devices coupled to IOBUS 180 and FBUS 190 in the preferred embodiment are described in copending U.S. patent application Ser. No. 08/699,597 (incorporated by reference above), and in copending U.S. patent application Ser. No. 08/751,149, filed on Nov. 15, 1996, issued on Jan. 12, 1999 as U.S. Pat. No. 5,860,158, entitled "Cache Control Unit with a Cache Request Transaction-Oriented Protocol," naming Yet-Ping Pai and Le Trong Nguyen as inventors (also incorporated by reference above).

Figure 2:
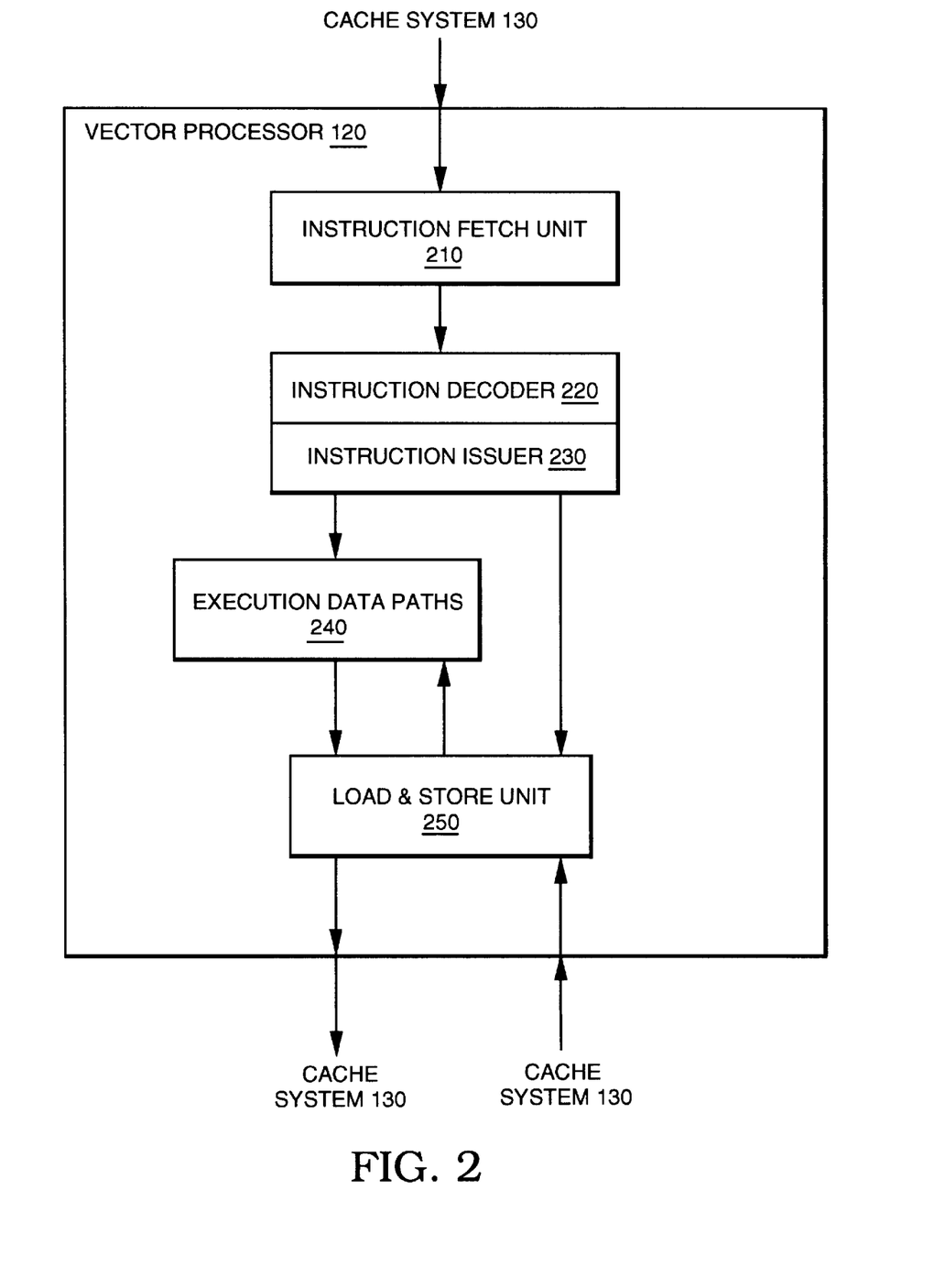
FIG. 2 is a block diagram of a vector processor in accordance with an embodiment of the invention.

Referring to FIG. 2, vector processor 120 includes instruction fetch unit 210, instruction decoder 220, instruction issuer 230, execution unit 240 and load/store unit 250. Instruction fetch unit 210 is coupled to cache system 130 and instruction decoder 220. Instruction decoder 220 is coupled to instruction fetch unit 210 and instruction issuer 230. Instruction issuer 230 is coupled to instruction decoder 220, execution unit 240, and load store unit 250. Execution unit 240 is coupled to instruction issuer 230 and load/store unit 250. Load/store unit 250 is coupled to instruction issuer 230, execution unit 240 and cache system 130.

Although load/store unit 250 is coupled to instruction issuer 230 and to execution unit 240 in the preferred embodiment, load/store unit 250 may be coupled to any type of vector processing unit or other requesting unit capable of requesting load or store operations. Also, although load/store unit 250 is coupled to cache system 130 in the preferred embodiment, load/store unit 250 may be coupled to any type of memory capable of servicing load and store requests for data stored or to be stored in the memory. Load/store unit 250 may be coupled to a memory hierarchy system (including, e.g., primary and secondary caches, main memory circuits and mass storage devices) or a component thereof. Further, although a combined load/store unit 250 is used in the preferred embodiment for facilitating both loads and stores, logic block boundaries are merely illustrative, and alternative embodiments may merge logic blocks or impose an alternative decomposition of functionality. For example, a store unit for facilitating only store or write instructions may be provided in accordance with the invention. Also, a load unit for facilitating only load or read instructions may be provided in accordance with the invention.

Instruction fetch unit 210 is responsible for prefetching instructions from instruction cache 132 and processing control flow instructions such as branch and jump-to-subroutine instructions. Instruction fetch unit 210 contains a 16-entry queue of prefetched instructions for the current execution stream and an 8-entry queue of prefetched instructions for the branch target stream. Instruction fetch unit 210 can receive 8 instructions from instruction cache 132 every cycle.

Instruction decoder and issuer 220, 230 are responsible for decoding and scheduling instructions. Instruction decoder 220 can decode one instruction per cycle in the order of instruction arrival from instruction fetch unit 210 and break each instruction into a plurality of micro-instructions. Each micro-instruction is associated with a functional unit in execution data path 240 or load/store unit 250. Instruction issuer 230 can schedule micro-instructions for execution depending on execution resources and operand data availability. Instruction issuer 230 issues micro-instructions indicating load or store operations to load/store unit 250.

Vector-processor 120 achieves much of its performance through various 288-bit data paths running at 12.5 ns/cycle in execution unit 240. The execution unit 240 data paths include the following: a four-ported register file that supports 2 reads and 2 writes per cycle; eight 32×32 parallel multipliers that can produce every 12.5 ns either eight 32-bit multiplications (in integer or floating point format), sixteen 16-bit multiplications or thirty two 8-bit multiplications; and, eight 32-bit arithmetic logic units (ALUs) that can produce every 12.5 ns either eight 32-bit ALU operations (in integer or floating point format), or sixteen 16-bit ALU operations or thirty two 8-bit or 9-bit operations. The execution unit 240 data paths are described in cofiled U.S patent application Ser. No. 08/790,142, attorney docket No. M-4679 US, entitled "Execution Unit Data Paths for a Vector Processor, which is incorporated herein by reference in its entirety.

Figure 3:
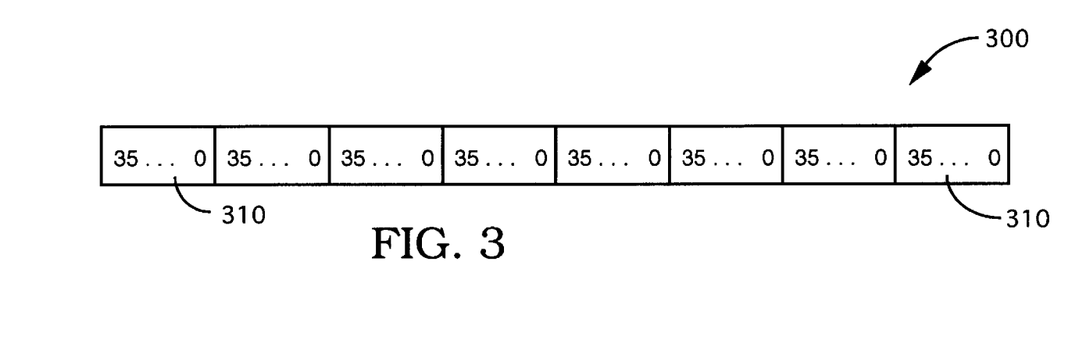
FIG. 3 is a diagram of a 288-bit data stream divided into slices according to an aspect of the invention.

FIG. 3 shows the format of a 288-bit data stream 300, which is divided into eight 36-bit slices 310 according to one embodiment of the invention. Each slice 310 can accommodate multiple data types. In one embodiment, shown in FIG. 4, each slice 310 handles one 32-bit data word, two 16-bit data words, four 9-bit data words, or four 8-bit data words. The 36-bit data slice is described in copending U.S. patent application Ser. No. 08/749,619, attorney docket No. M-4601 US, entitled "Adder which Handles Multiple Data with Different Data Types," filed Nov. 18, 1996, which is incorporated herein by reference in its entirety.

Load/store unit 250 is designed to interface with data cache 134 through separate read and write data buses each of which is 256-bits wide. Load/store unit 250 executes load and store micro-instructions by handling the interactions between execution unit 240 and cache system 130.

Figure 5:
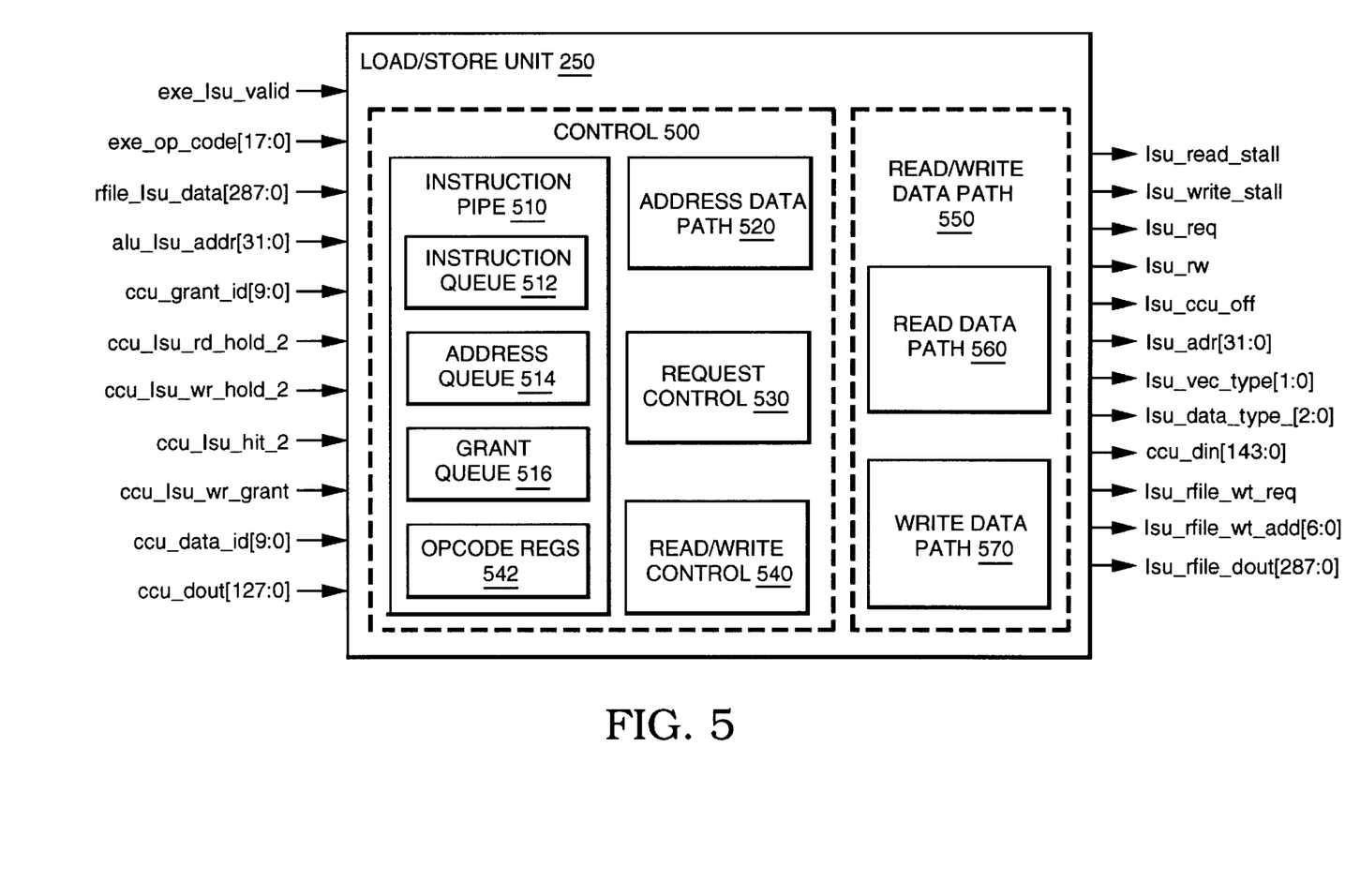
FIG. 5 is a block diagram of a load/store unit in accordance with an embodiment of the invention.

Referring to FIG. 5, load/store unit 250 includes control logic 500 and read/write data path 550. Control logic 500 includes instruction pipe 510, address data path 520, request control logic 530 and read/write control logic 540. Read/write data path 550 includes read data path 560 and write data path 570. Instruction pipe 510 includes instruction queue 512, address queue 514 and grant queue 516. The input and output signals of load/store unit 250 are defined in Tables 1, 2 and 3.

TABLE 1

Instruction Issue Interface.

| Name | Definition |
|---|---|
| lsu_read_stall | Asserted to indicate that, at the next cycle, the load/store unit (LSU) cannot receive another load or cache operation instruction. A load/store unit instruction being issued in the current cycle is not affected by this signal. |
| lsu_write_stall | Asserted to indicate that, at the next cycle, the LSU cannot receive another store instruction. An LSU instruction being issued in the current cycle is not affected by this signal. |
| exe_lsu_valid | Asserted for one cycle to indicate that a load, store or a cache operation instruction is being issued, in this cycle, to the LSU. This signal is asserted in the cycle the load/store unit instruction is in the read state. |
| exe_lsu_op_code [17:0] | Valid only in the cycle exe_lsu_valid is asserted. The format of the 16 bits are: <br> [17:13] opcode (same as in the instruction format) <br> [12] when set, asserts cache off <br> [11:9] data type (same as in the instruction format) <br> [8] when set, indicates a vector destination register <br> [7] when set, indicates the alternate bank <br> [6:2] register number <br> [1] when set indicates that the store data is given to load/store unit 250 in the next cycle. Otherwise, it is given in the current cycle. |
| rfile_lsu_data [287:0] | See exe_lsu_op_code[1] for timing. |
| alu_lsu_addr[31:0} | Valid one cycle after exe_lsu_valid is asserted. This is the effective address. |

TABLE 2

Data Cache Interface.

| Name | Definition |
|---|---|
| ccu_grant_id[9:0] | Indicates which unit may request to cache control unit for which data in current cycle. <br> [9:6] Unit ID. <br> [5:0] Transaction ID |
| lsu_req | Asserted for one cycle to request data cache access in current cycle. |
| lsu_rw | Valid only when lsu_req is asserted. When asserted indicates a load request; when deasserted indicates a store request. |
| lsu_ccu_off | Valid only when lsu_req is asserted. Asserted to indicate a cache off access. For cache operation, this signal is deasserted. |
| lsu_adr[31:0] | Data cache access address. Valid only when lsu_req is asserted. |
| lsu_vec_type[1:0] | Valid only in the cycle lsu_req is being asserted. Indicates size of the access: <br> 0x scalar <br> 10 vector access that is within a 64-byte boundary <br> 11 vector access that crosses a 64-byte boundary |
| lsu_data_type[2:0] | Valid only in the cycle lsu_req is being asserted. Indicates the data type of a store access (since load alignment is handled within the LSU). <br> 00x byte store to 8-bits <br> 01x byte 9 store to 8-bits by truncating upper 1 bit <br> 10x halfword store to 16-bits <br> 110 byte 9 store to 8-bits by zero-extending upper 7 bits <br> 111 word store to 32-bits |
| ccu_lsu_rd_hold_2 | This is a ph2 signal. Asserted to indicate that the read request being made in the current cycle is not being accepted. |
| ccu_lsu_wr_hold_2 | This is a ph2 signal. Asserted to indicate that the write request being made in the current cycle is not being accepted. |
| ccu_lsu_hit 2 | This is a ph2 signal. Asserted one cycle after lsu_req to indicate cache hit. |
| ccu_lsu_wr_grant | Asserted to indicate that the store data can be sent to the CCU via ccu_din during the next cycle |
| ccu_din[143:0] | This is a double-pumped bus. The lower 144 of 288 bits are sent in ph1 and the upper 144 bits are sent in ph2. For a scalar register store, all 32 bits are sent via ccu_din[31:0]. |
| ccu_data_id[9:0] | This bus contains signal used for returning a cache miss. The encodings are identical to ccu_grant_id. The identified unit is to match the transaction ID with the grand ID it has saved when the request was made. If the match occurs, the data is to be received on the ccu_dout but during the next cycle. |
| ccu_dout[127:0] | This is a double-pumped bus. The lower 128 of 256 bits are sent in ph1 and the upper 128 bits are sent in ph2. For a scalar |

TABLE 2-continued

Data Cache Interface.

| Name | Definition |
| --- | --- |
| | register load, all 256 bits are sent so that the LSU can select the right bits (8, 9, 16, 32, 256 or extend to 288). |

TABLE 3

Result Bus Interface.

| Name | Definition |
| --- | --- |
| lsu_rfile_wt_req | Asserted for one cycle to indicate that a load data will be returned during the next cycle. |
| lsu_rfile_wt_addr[6:0] | Valid only when lsu_rfile_wt_req is asserted. This is the destination register number. The encodings are:<br>[6] set to indicate a vector register<br>[5] set to indicate the alternate bank<br>[4:0] indicates the register number |
| lsu_rfile_wt_set[4:0] | Valid only when lsu_rfile_wt_req is asserted. Indicates the first byte from which the returning load data is to be written. This is to handle partial register file write for unaligned load. |
| lsu_rfile_wt_num_byte[4:0] | Valid only when lsu_rfile_wt_req is asserted. Indicates the number of bytes (starting from the lsu_rfile_wt_off_set) to write for the returning load data. This is to handle partial register file write for unaligned load. |
| lsu_rfile_dout[287:0] | Valid only during one cycle after lsu_rfile_wt_req is asserted. Load result bus to the write stage. |

Figure 6:
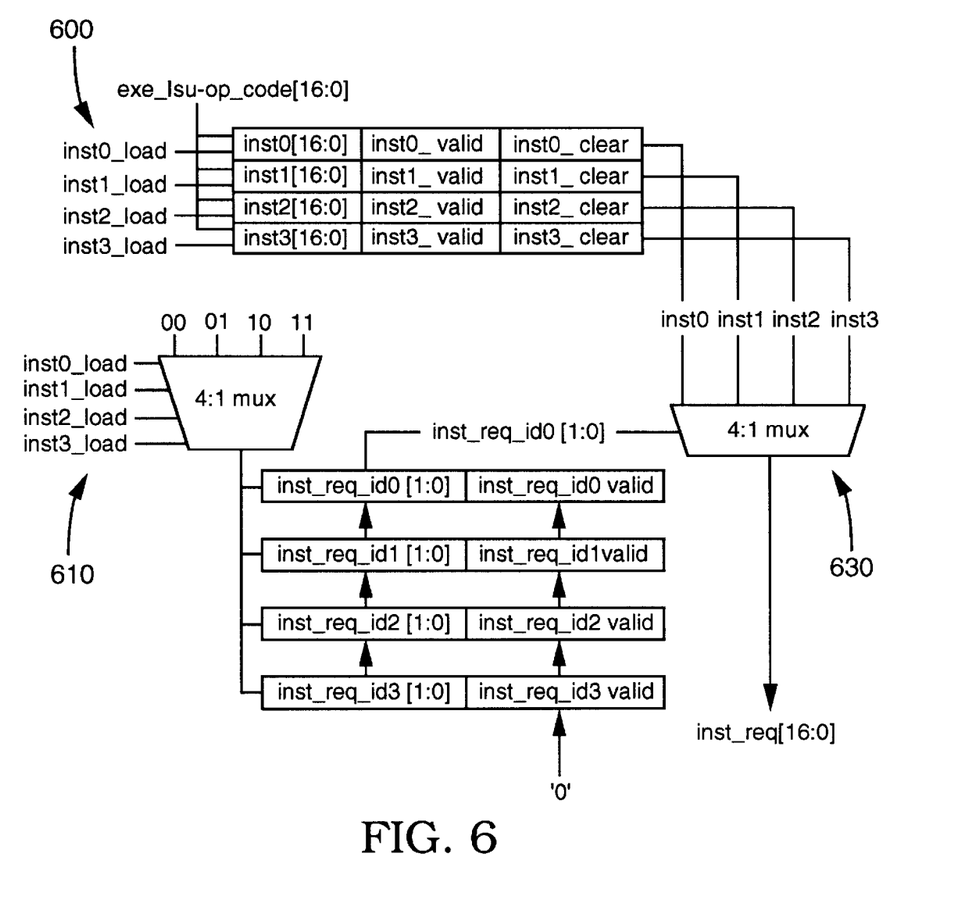
FIG. 6 is a diagram of a micro-instruction pipe for a load/store unit in accordance with an embodiment of the invention.

Referring to FIG. 6, instruction queue 512 and address queue 514 each have a depth of 4 instructions and addresses, respectively. Instruction pipe 510 receives micro-instructions and addresses from instruction issuer 230 and execution unit 240, and makes requests to cache system 130. The micro-instructions are received via exe_lsu_op_code [16:0]. The micro-instructions are stored by instruction pipe 510 in the 4-entry deep instruction queue 512. Address queue 514 (not shown in FIG. 6) stores addresses corresponding to the instructions stored in instruction queue 512. In the preferred embodiment, instruction pipe 510 uses four control lines to determine the position of the next micro-instruction in instruction queue 512. The four control lines are inst0_load, inst1_load, inst2_load and inst3_load. If instruction queue 512 is full, load/store unit 250 sends a stall signal (e.g., lsu_read_stall) to instruction issuer 230 to prevent issue of an instruction requiring a micro-instruction that load/store unit 250 cannot currently accept. Each entry of instruction queue 512 contains 17 bits to store a micro-instruction, a bit for storing a micro-instruction valid flag, and a bit for storing a micro-instruction clear flag. A request ID is stored in grant queue 516 along with a request ID valid bit. The top request ID in the grant queue controls multiplexer 630 which selects the next instruction for presentation to cache system 130.

Address data path 520 selects a cache address from either address queue 514 or a new incoming address calculated in execution unit 240. The new address comes from execution unit 240 simultaneously with a corresponding micro-instruction issued by instruction issuer 230.

Request control logic 530 requests access to cache system 130 according to a selected micro-instruction in the instruction queue of instruction pipe 510 and monitors interface signals from cache control unit 138 which controls access to cache system 130. Request control logic 530 also controls how cache access is requested depending on the format of the load/store data.

If the load and store request address provided by address path 520 to cache control unit 138 is vector-unaligned, i.e., the address is not a multiple of 32 bytes, the request is broken down to two separate aligned requests. The first request uses the original starting address with the lowest 5 bits as zeros. The second request uses the first address plus 32. The actual data requested by the micro-instruction straddles these two requests. Read/write data path 550 assembles the requested 288-bit vector from the 256-bit quantities returned by cache system 130.

When loading an aligned vector having 9-bit data elements, the cache load request is also broken down to 2 separate cache requests. The first request uses the original starting address. (For aligned vectors the 5 lowest address bits are zeros.) The second request uses the first address plus 32. 9-bit data elements are stored in memory as 16-bit values with the 7 most significant bits being zeros. Accordingly, one 288-bit vector having 9-bit data elements occupies 512 bits (or 64 bytes) of memory. Read/write data path 550 removes the upper 7 bits from each set of 16-bits in two 256-bit values returned.

When storing a vector having 9-bit data elements, only one store request is sent to cache control unit 138. Cache control unit 138 extends each 9-bit byte into two 8-bit bytes (or 16 bits) by filling the extra 7 bits with zeros. Two 256-bit values are written to cache system 130.

Read/write control logic 540 controls queues in read/write data path 550 and generates control signals for data alignment in read/write data path 550. Specifically, read/write control logic 540 controls a read buffer queue in read data path 560 and a write buffer queue in write data path 570.

Read data path 560 receives data from cache system 130 when a load request is granted and a read transaction ID is issued to load/store unit 250 by cache control unit 138, when there is a data cache hit corresponding to the load request, and when the request data ID in the returned data matches with the corresponding read transaction ID previously granted to load/store unit 250 by cache control unit 138. Read data path 560 also performs data alignment of unaligned load data according to the vector data type being used. For example, if the request address is unaligned, the requested data vector will straddle two 256-bit vectors from data cache 134 and a byte aligner in read/write data path 550 selects the requested data bytes and aligns the data bytes in a 288-bit format for execution unit 240. The resulting data is sent to the register file through a read buffer. The read buffer has a depth of two entries.

Write data path 570 receives data from the register file and transfers the data to cache system 130 when a load/store unit store request is granted by cache control unit 138. In this block the write buffer has a depth of four entries. Cache system 130 contains circuitry which converts a 288-bit vector into a format for storage in cache memory. Signal lsu_data_type[2:0] indicates a data type and therefore the type of conversion required.

In operation, load/store unit 250 performs load and store instructions for vector processor 120. Load/store unit 250 handles up to 4 pending micro-instructions from instruction issuer 230 and corresponding effective addresses calculated by execution unit 240. Vectors are provided to load/store unit 250 from the register file (e.g., execution unit 240). Load/store unit 250 receives a micro-instruction from instruction issuer 230 when an instruction being executed requires a memory access. When instruction issuer 230 asserts an instruction valid signal (drives exe_lsu_valid high), the address being issued from execution unit 240 to load/store unit 250 (exe_lsu_op_code[16:0]) is valid and load/store unit 250 receives the micro-instruction into the instruction queue of instruction pipe 510. Otherwise, load/store unit 250 ignores all incoming micro-instructions as being invalid. A micro-instruction that is present at the input of load/store unit 250 is invalid, e.g., if it it has already been processed. The exe_lsu_valid signal indicates to load/store unit when to read its opcode input.

If the instruction queue is full, instruction pipe 510 asserts a read-stall signal (lsu_read_stall high). In this case, instruction issuer 230 will not issue new micro-instructions until the read-stall signal is deasserted (lsu_read_stall low). When the instruction queue contains at least one micro-instruction and grant signal ccu_grant permits a request, request control logic 530 requests cache access by asserting request signal lsu_req and drive signal lsu_adr according to a value from address data path 520. Signal lsu_wr is asserted (or not) to identify the request as a load (or a store). If cache control unit 138 deasserts the read or write hold signal, cache control unit 138 accepts the request. If the cache control hold signal is asserted (high), request control logic 530 must retry the request and assert signal lsu_req.

For a store request, when request control logic 530 receives a write grant signal, request control logic 530 asserts signal lsu_request, and if cache control unit 138 deasserts signal ccu_lsu_wr_hold, request control logic 530 asserts signal lsu_adr according to the value from address data path 520. Read/write control logic 540 directs write data path 570 to send 288-bits of store data to cache system 130 at the next CLK1 and CLK2 phases (144 bits/phase) after cache control unit 138 asserts signal ccu_lsu_wr_grant. Instructionpipe 510 then removes the current store request micro-instruction from the instruction queue to make room for a new incoming micro-instruction from execution unit 240.

For a load, request control logic 530 monitors the read hold signal ccu_lsu_rd_hold_2 from cache control unit 138. Cache control unit 138 deasserts the read hold signal to grant read access. Instruction pipe 510 updates the instruction queue and may process another load or store request, if available, while waiting for the load data.

When request control logic 530 detects the deasserted read hold signal from cache control unit 138, instruction pipe 510 saves a transaction ID in a grant ID queue. When cache control unit 138 asserts cache hit signal ccu_lsu_hit_2 following the cycle of the read grant signal, read data path 560 receives read data from data cache 134, and instruction pipe 510 removes the current request from both the instruction queue and the grant ID queue of instruction pipe 510.

If the cache hit signal is not asserted (ccu_lsu_hit_2 is low) following the cycle of the read grant signal, request control logic 530 monitors the incoming data ID lines from cache control unit 138. When the incoming data ID matches a transaction ID previously saved in the grant ID queue of instruction pipe 510, read data path 560 receives the read data from data cache 134 during the cycle following the cycle in which the match was indicated. Instruction pipe 510 then removes the current request from both the instruction queue and the grant ID queue.

If the grant ID queue is 75 percent full (i.e. three entries are used and only one unused entry is left), load/store unit 250 stops making requests to cache control unit 138 and waits until the grant ID queue reduces to 25 percent full (i.e. only one entry is used and three entries are available) so that it won't miss a transaction ID from cache control unit 138. Transaction IDs could be pipelined, so load/store unit 250 stops making requests to cache control unit 138 when the grant ID queue is 75 percent full.

If there is a cache hit or a match between a transaction ID and data ID, the requested micro-instruction is selected from the instruction queue and saved to the relevant micro-instruction register (i.e., 17 bit read opcode register rd_op_code[16:0] for a load or 17 bit write opcode register wr_op_code[16:0] for a store). The micro-instruction in the opcode register is used to control read or write data paths 560, 570, to interface signals to the register file of execution unit 240.

Figure 7:
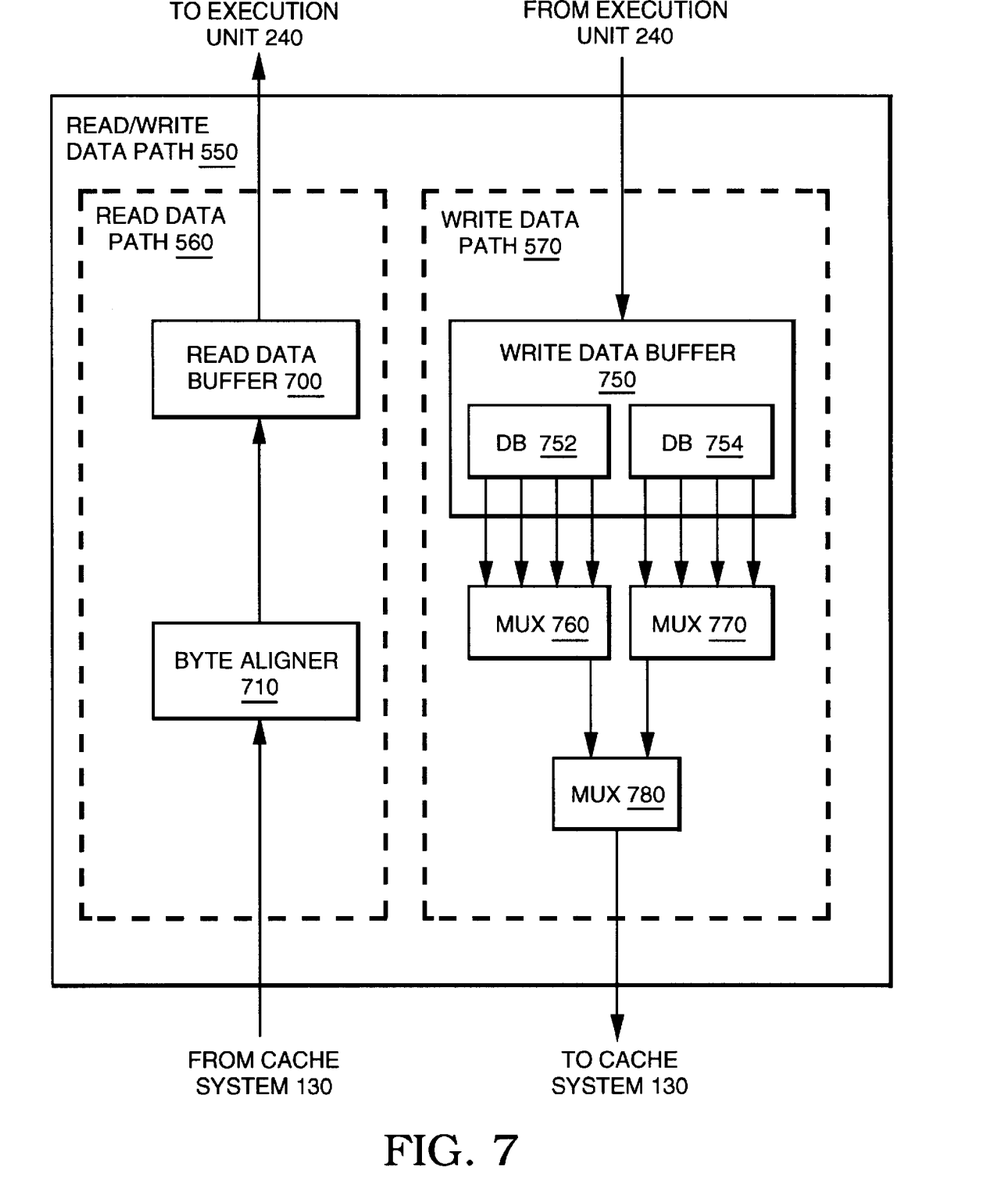
FIG. 7 is a block diagram of read/write data paths for a load/store unit in accordance with an embodiment of the invention.

Referring to FIG. 7, an exemplary embodiment of read/write data path 550 is shown. Read/write data path 550 includes read data path 560 and write data path 570. Read data path 560 includes byte aligner 710 and read data buffer 700. Byte aligner 710 is coupled to cache system 130 and read data buffer 700. Read data buffer 700 is coupled to byte aligner 710 and execution unit 240. Write data path 570 includes write data buffer 750, multiplexer 760, multiplexer 770 and multiplexer 780. Write data buffer 750 is coupled to execution unit 240 and multiplexers 760 and 770. Multiplexers 760 and 770 are coupled to write data buffer 750 and multiplexer 780. Multiplexer 780 is coupled to multiplexers 760 and 770 and cache system 130. Write data buffer 750 includes two data buffers, data buffer 752 and data buffer 754, which are coupled to multiplexer 760 and multiplexer 770, respectively.

Write data buffer 750 receives 288-bits over a 288-bit bus from execution unit 240. Data buffer 752 receives 144 bits, and data buffer 754 receives 144 bits. Multiplexer 450 of write data path 570 is used to select data from data buffer 752. Multiplexer 770 is used to select data from data buffer 754. Multiplexer 780 is used to alternately select data buffer 752 or data buffer 754. The bus connecting multiplexer 780 with cache system 130 is a 256-bit logical bus. The bus is a double-pumped bus. Multiplexer. 780 provides 128 bits in a first phase and 128 bits in a second phase.

Figure 4:
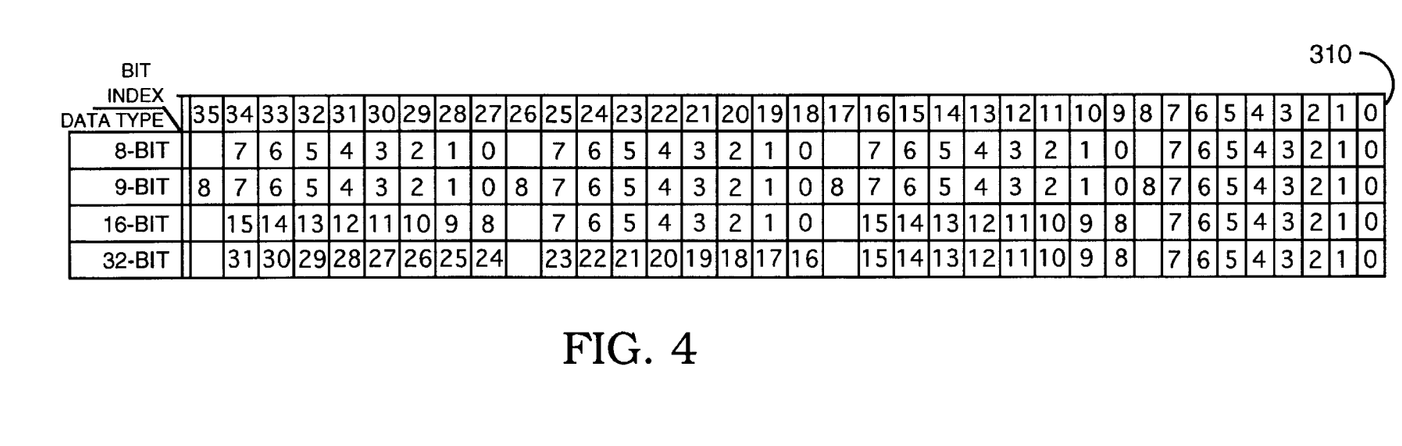
FIG. 4 is a table showing various data types within a data slice for an aspect of the present invention.

During an unaligned load (i.e., a load from an address that is not a multiple of 256), read data path 560 performs the necessary alignment so that unaligned data may be extracted from an aligned 256-bit value. Additionally, byte aligner 710 aligns data bytes from a 256-bit value in a 288-bit vector as illustrated in FIGS. 3 and 4.

For example, in a 9-bit byte load, load/store unit 250 receives a 9-bit byte load request from execution unit 240. Since the memory system is based on 8-bit bytes, loading a 9-bit byte (byte9) requires two 8-bit bytes or 16 bits. Therefore, request control logic 530 generates two 8-bit byte load requests to cache control unit 138. The first request uses the original starting address with the lowest 5 bits as zeros, and the second request address is the first request address plus 32. When the requested information is returned from cache system 130, the upper 7 bits of the upper 8-bit byte are removed by byte aligner 710. The lower 1-bit of the upper 8-bit byte is then combined with the lower 8-bit byte and provided to read buffer 700 for transfer to execution unit 240. With this process, loading a vector with thirty two 9-bit bytes therefore requires sixty four 8-bit bytes from data cache 134.

In each unaligned 8-bit, 16 bit, or 32-bit vector load, load/store unit 250 receives a 32-byte load request for 32 bytes stored at an address that is not a multiple of 32 from execution unit 240. Since the memory system loads by 32-byte lines, loading 32 bytes that are unaligned requires two 32-byte loads. Therefore, request control logic 530 generates two 32-byte load requests to cache control unit 138. The first request uses the address of the first line to be requested with the lowest 5 bits as zeros. The second request address is the first request address plus 32. When the requested information is returned from cache system 130, the unneeded portions (each of which is an 8 bit, 16-bit or 32-bit segment depending on the type of unaligned vector load) of the first request is removed by byte aligner 710. The needed portion is then combined with the needed portion of the second request and provided to read buffer 700 for transfer to execution unit 240. With this process, loading a vector with thirty two 8-bit bytes therefore requires sixty four 8-bit bytes from data cache 134.

When storing a byte9 vector (with a length of thirty-two 9-bit bytes), load/store unit 250 receives a 9-bit byte vector store request from execution unit 240. Since the memory system is based on 8-bit bytes, storing a 9-bit byte (byte9) requires two 8-bit bytes or 16 bits. However, only one store request is sent to cache control unit 138. Cache control unit 138 extends the 9-bit byte into two 8-bit bytes (or 16 bits) and fills the extra 7 bits of the upper 8-bit byte with zeros. An advantage of doing store alignment in cache system 130 is the availability of data elements in aligned cache lines that are preserved by unaligned stores that affect only some of the data elements in the cache line.

While the invention has been described with reference to various embodiments, it will be understood that these embodiments are illustrative and that the scope of the invention is not limited to them. Many variations, modifications, additions, and improvements of the embodiments described are possible in accordance with the invention as claimed. Those skilled in the art will recognize that alternative embodiments may be implemented in agreement with the present invention. For example, those skilled in the art will recognize that boundaries between logic blocks are merely illustrative. That is, alternative embodiments may merge logic blocks or impose an alternative decomposition of functionality. For example, the various logic blocks of load/store unit 250 may be structured in different ways. Specifically, a load unit and a store unit may be provided in accordance with the invention. Also, separate or combined data paths may be provided in accordance with the invention. Moreover, alternative embodiments may combine multiple instances of a particular component, or may employ alternative polarities of signals. For example, control signals may be asserted low instead of high, as in the preferred embodiment. Other implementations of instruction, address and data pipelines, and read/write control logic and the busses connecting them may be used to create a load/store unit 250 according to the present invention. Other implementations of memory or cache systems, bus interfaces and busses, and processors may be used to create a computer system according to the present invention. These and other variations, modifications, additions, and improvements may fall within the scope of the invention as defined in the claims which follow.

What is claimed is:

1. A load/store unit coupled to a requesting unit and a memory, the load/store unit comprising:

a read/write data path coupled to the requesting unit and the memory, the data path for buffering a vector, the vector including a plurality of data elements of a substantially similar data type; and a request control circuit coupled to the data path and the requesting unit, the request control circuit for receiving a vector memory request from the requesting unit, the vector memory request for requesting transference of the vector between the requesting device and the memory, the request control circuit servicing the vector memory request by causing the transference of the vector from the requesting unit to the memory via the read/write data path if the vector memory request is a store request, and by causing the transference of the vector from the memory to the requesting unit via the read/write data path if the vector memory request is a load request, wherein the request control circuit comprises:

an instruction pipe for receiving at least one vector memory request from the requesting unit, the instruction pipe including an instruction queue for buffering the at least one vector memory request, the instruction queue including a plurality of entries for storing the at least one vector memory request;

an address data path coupled to the instruction pipe and the requesting unit, the address data path for selecting a memory address from one of the instruction pipe and the requesting unit;

a request control block coupled to the address data path, the request control block generating at least one memory access request for each of the at least one vector memory request, the request control block controlling the manner of memory access according the data type of the vector; and a read/write control block coupled to the request control block, the read/write control block for controlling the read/write data path.

2. The apparatus of claim 1, wherein the instruction pipe further comprises a grant queue for storing a plurality of transaction IDs, the instruction queue including a plurality of entries for storing the plurality of transaction IDs, each of the plurality of transaction IDs identifying each of the at least one memory access request.

3. The apparatus of claim 1, wherein:

the request control block generates a plurality of aligned vector requests corresponding to each of the at least one vector memory request that is vector unaligned, and generates a plurality of 8-bit byte memory requests corresponding to each of the at least one vector memory request if the at least one vector memory request is for a 9-bit byte vector data type; and the read/write data path assembles a plurality of results provided by the memory in response to each of the at least one vector memory request, the plurality of results being assembled into a first vector result, if the at least one vector memory request is for an unaligned vector read, and assembles a plurality of 8-bit byte results provided by the memory in response to the at least one vector memory request, the plurality of 8-bit byte results being assembled into a 9-bit byte result, if the at least one vector memory request is for a 9-bit byte memory read.

4. The apparatus of claim 1, wherein the requesting unit comprises a functional data execution unit.

5. The apparatus of claim 1, wherein the requesting unit comprises an instruction issuer circuit.

6. The apparatus of claim 1, wherein the memory comprises a cache system.

7. A load/store unit coupled to a requesting unit and a memory, the load/store unit comprising:

a read/write data path coupled to the requesting unit and the memory, the read/write data path for buffering a vector, the vector including a plurality of data elements of a substantially similar data type; and a request control circuit coupled to the read/write data path and the requesting unit, the request control circuit for receiving a vector memory request from the requesting unit, the vector memory request for requesting transference of the vector between the requesting device and the memory, the request control circuit servicing the vector memory request by causing the transference of the vector from the requesting unit to the memory via the read/write data path if the vector memory request is a store request, and by causing the transference of the vector from the memory to the requesting unit via the read/write data path if the vector memory request is a load request, wherein:

the request control circuit is coupled to the memory, the request control circuit for providing memory access requests to the memory;

the memory includes a memory control circuit for receiving the memory access requests from the request control circuit, for providing a unique transaction ID for each memory access request to the request control circuit; and the request control circuit includes a grant queue for storing each transaction ID, the request control circuit receiving a result for each memory access request and a corresponding transaction ID identifying to which request the result corresponds if the vector memory request is a vector load request.

8. The apparatus of claim 7, wherein the requesting unit is a functional data execution unit.

9. The apparatus of claim 7, wherein the requesting unit is an instruction issuer circuit.

10. The apparatus of claim 7, wherein the memory is a cache system.

11. An apparatus coupled to a requesting unit and a memory, the apparatus comprising:

a data path coupled to the requesting unit and the memory, the data path for buffering a vector, the vector including a plurality of data elements of a substantially similar data type; and a request control circuit coupled to the data path and the requesting unit, the request control circuit for receiving a vector memory request from the requesting unit, the vector memory request for requesting transference of the vector between the requesting device and the memory, the request control circuit servicing the vector memory request by causing the transference of the vector between the requesting unit and the memory via the data path; wherein:

the data path includes a read data path for buffering the vector to be transferred from the memory to the requesting unit;

the request control circuit is coupled to the read data path and the requesting unit, the request control circuit for receiving a vector memory read request from the requesting unit, the request control circuit servicing the vector memory read request by causing the read data path to receive the vector from the memory and to provide the vector to the requesting unit;

the request control circuit is coupled to the memory, the request control circuit for providing memory access requests to the memory;

the memory includes a memory control circuit for receiving the memory access requests from the request control circuit and for providing a unique transaction ID for each memory access request to the request control circuit; and the request control circuit includes a grant queue for storing each transaction ID, the request control circuit receiving a result for each memory access request and a corresponding transaction ID identifying to which request the result corresponds if the vector request is a vector load request.

12. A computer system comprising:

a vector processor;

a memory; and a load unit, the load unit coupled to the vector processor and the memory, the load unit comprising:

a read data path for buffering a vector, the vector including a plurality of data elements of a substantially similar data type, the read data path providing the vector to the requesting unit responsive to receiving the vector from the memory; and a request control circuit coupled to the read data path and the vector processor, the request control circuit for receiving a vector memory request from the vector processor, the request control circuit servicing the vector memory request by causing a transference of vectors corresponding to the vector memory request between the vector processor and the memory via the read data path;

wherein the memory has a data width;

the read data path includes:

a byte aligner, the byte aligner receiving the vector from the memory, the vector having a data type, the data type having a data type width, the byte aligner assembling the vector if the vector data type width is greater than the memory data width; and a read data buffer for buffering the vector, the read data buffer receiving the vector from the byte aligner and providing the vector to the vector processor.

13. A computer system comprising:

a vector processor;

a memory; and a load/store unit, the load/store unit coupled to the vector processor and the memory the load/store unit comprising:

a read/write data path for buffering a vector, the vector including a plurality of data elements of a substantially similar data type; and a request control circuit coupled to the read/write data path and the vector processor, the request control circuit for receiving a vector memory request from the vector processor, the request control circuit servicing the vector memory request by causing a transference of vectors corresponding to the vector memory request between the vector processor and the memory via the read/write data path;

wherein the load/store unit is packaged within the vector processor;

the vector processor includes a requesting unit; and the request control circuit comprises:

an instruction pipe for receiving a plurality of requests from the requesting unit, the instruction pipe including an instruction queue for buffering the plurality of requests, the instruction queue including a plurality of entries for storing the plurality of requests;

an address data path coupled to the instruction pipe and the requesting unit, the address data path for selecting a memory address from one of the instruction pipe and the requesting unit;

a request control block coupled to the address data path, the request control block requesting access to the memory for each of the plurality of requests from the requesting unit, the request control block controlling the manner of memory access according the data type of the vector; and a read/write control block coupled to the request control block, the read/write control block for controlling the read/write data path.

14. A load/store unit comprising:

a vector processor;

a memory; and a load/store unit, the load/store unit coupled to the vector processor and the memory, the load/store unit comprising:

a read/write data path for buffering a vector, the vector including a plurality of data elements of a substantially similar data type; and a request control circuit coupled to the read/write data path and the vector processor, the request control circuit for receiving a vector memory request from the vector processor, the request control circuit servicing the vector memory request by causing a transference of vectors corresponding to the vector memory request between the vector processor and the memory via the read/write data path; wherein the request control circuit is coupled to the memory, the request control circuit for providing memory access requests to the memory;

the memory includes a memory control circuit for receiving the memory access requests from the request control circuit and for providing a unique transaction ID for each memory access request to the request control circuit; and the request control circuit includes a grant queue for storing each transaction ID, the request control circuit receiving a result for each memory access request and a corresponding transaction ID to identify to the request control circuit to which request the result corresponds if the vector request is a vector load request.

15. A method for loading and storing unaligned vector data with variable data types, the method comprising:

receiving a first vector request for a first vector, the first vector request requesting access to a memory, the first vector including a plurality of data elements of a substantially similar data type;

determining whether the first vector request is vector unaligned;

generating a plurality of aligned vector requests corresponding to the first vector request if the first vector request is vector unaligned;

providing the aligned vector requests to the memory; and servicing the aligned vector requests by the memory; wherein the first vector includes a first portion and a second portion;

the step of generating a plurality of aligned vector requests includes:

providing a first aligned vector request corrresponding to a first vector-width portion of the memory, the first vector-width portion of the memory including the first portion of the first vector;

providing a second aligned vector request corresponding to a second vector-width portion of the memory, the second vector-width portion of the memory including the second portion of the first vector;

the first vector request is a vector store request; and the step of servicing the aligned vector requests comprises storing the first vector, the first portion of the first vector stored in a first aligned vector, the second portion of the first vector stored in a second aligned vector.

16. A method for loading and storing unaligned vector data with variable data types, the method comprising:

receiving a first vector request for a first vector, the first vector request requesting access to a memory, the first vector including a plurality of data elements of a substantially similar data type;

determining whether the first vector request is vector unaligned;

generating a plurality of aligned vector requests corresponding to the first vector request if the first vector request is vector unaligned;

providing the aligned vector requests to the memory; and servicing the aligned vector requests by the memory; wherein the first vector includes a first portion and a second portion;

the step of generating a plurality of aligned vector requests includes providing a first aligned vector request corresponding to a first vector-width portion of the memory, the first vector-width portion of the memory including the first portion of the first vector;

providing a second aligned vector request corresponding to a second vector-width portion of the memory, the second vector-width portion of the memory including the second portion of the first vector;

the first vector request is a vector load request;

the step of servicing the aligned vector requests comprises:

receiving a plurality of results corresponding to the aligned vector requests from the memory;

assembling the plurality of results into the first vector if the vector load request is for unaligned vector data; and providing the first vector to the requesting unit; and the step of receiving the plurality of results includes:

receiving a first vector-width result including a first portion and a second portion, the second portion of the first vector-width result including the first portion of the first vector; and receiving a second vector-width result including a first portion and a second portion, the first portion of the second vector-width result including the second portion of the first vector; and the step of assembling the plurality of results into the first vector includes combining the second portion of the first vector-width result with the first portion of the second vector-width result to provide the first vector.

17. A method for loading and storing 9-bit byte data in an 8-bit byte memory system, the method comprising:

receiving a 9-bit byte memory request from a requesting device;

generating a plurality of 8-bit byte memory requests corresponding to the 9-bit byte memory request;

providing the plurality of 8-bit byte memory requests to a memory system;

storing a plurality of 8-bit bytes corresponding to the 8-bit byte memory requests in the 8-bit byte memory system if the 9-bit byte memory request is a memory write;

receiving a plurality of 8-bit byte results corresponding to the plurality of 8-bit byte memory requests if the 9-bit byte memory request is a memory read;

assembling the plurality of 8-bit byte results into a 9-bit byte result if the 9-bit byte memory request is a memory read; and providing the 9-bit byte result to the requesting device if the 9-bit byte memory request is a memory read.

18. The method of claim 17, further comprising:

receiving the provided plurality of 8-bit byte memory requests by the memory;

providing a unique 8-bit byte transaction ID for each of the plurality of 8-bit byte memory requests received by the memory;

storing each of the provided 8-bit byte transaction IDs in a grant queue; and receiving a plurality of corresponding 8-bit byte transaction IDs with the plurality of 8-bit byte results if the 9-bit byte memory request is a memory read, the transaction IDs identifying which of the plurality of 8-bit byte memory results corresponds to each 8-bit byte requests.

19. The method of claim 17, wherein the 9-bit byte includes an upper 1 bit and a lower 8 bits, and the step of generating a plurality of 8-bit byte memory requests from the 9-bit byte memory request includes providing a first 8-bit byte memory request corresponding to an 8-bit memory byte including the upper 1 bit of the 9-bit byte, and providing a second 8-bit byte memory request corresponding to an 8-bit memory byte including the lower 8 bits of the 9-bit byte.

20. The method of claim 19, wherein:

the step of receiving the plurality of 8-bit byte results includes:

receiving a first 8-bit byte result, the first 8-bit byte result including an upper 7 bits and a lower 1 bit, the lower 1 bit being the upper 1 bit of the 9-bit byte, and receiving a second 8-bit byte result, the second 8-bit byte result including the lower 8 bits of the 9-bit byte; and the step of assembling the plurality of 8-bit byte results into a 9-bit byte result includes combining the lower 1 bit of the first 8-bit byte with the second 8-bit byte result to provide the 9-bit byte result.

21. A method for out-of-order loading and storing of vectors through the use of transaction ID tags, comprising:

a first step of receiving a first vector request from a first requesting device by a load/store unit;

a second step of providing a first memory request corresponding to the first vector request to a memory system by the load/store unit after the first step;

a third step of providing a first transaction ID tag indicating the first memory request to the load/store unit by the memory system after the second step;

a fourth step of storing the first transaction ID tag by the load/store unit after the third step;

a fifth step of receiving a second vector request from a second requesting device by the load/store unit after the first step;

a sixth step of providing a second memory request corresponding to the second vector request to the memory system by the load/store unit after the fifth step;

a seventh step of providing a second transaction ID tag indicating the second memory request to the load/store unit by the memory system after the sixth step;

an eighth step of storing the second transaction ID tag by the load/store unit after the seventh step;

a ninth step of receiving by the load/store unit a first memory request result and the first transaction ID tag if the first memory request result is required by the first memory request, the ninth step being after the third step;

a tenth step of receiving by the load/store unit a second memory request result and the second transaction ID tag if the second memory request result is required by the second memory request, the tenth step being after the eighth step;

an eleventh step of providing the first request result and the first transaction ID tag to the first requesting device by the load/store unit if the first memory request result is required by the first vector request, the eleventh step being after the ninth step; and a twelfth step of providing the second request result and the second transaction ID tag to the second requesting device by the load/store unit if the second memory request result is required by the second vector request, the twelfth step being after the tenth step.

22. The method of claim 21, wherein the memory system is a cache system.

23. The method of claim 22, wherein the first requesting unit and the second requesting unit are the same unit.

* * * * *